(12) United States Patent
Cotter

(10) Patent No.: US 10,113,605 B2
(45) Date of Patent: Oct. 30, 2018

(54) OVERTRAVEL RELIEF ASSEMBLY FOR A GAS SPRING

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 0 days.

(21) Appl. No.: 15/707,038

(22) Filed: Sep. 18, 2017

(65) Prior Publication Data

US 2018/0087595 A1   Mar. 29, 2018

Related U.S. Application Data

(60) Provisional application No. 62/401,603, filed on Sep. 29, 2016.

(51) Int. Cl.
| | |
|---|---|
| *F16F 9/34* | (2006.01) |
| *F16F 9/43* | (2006.01) |
| *F16F 9/02* | (2006.01) |

(52) U.S. Cl.
CPC ............ *F16F 9/432* (2013.01); *F16F 9/0218* (2013.01); *F16F 9/0281* (2013.01);
(Continued)

(58) Field of Classification Search
CPC ...... F16F 9/0218; F16F 9/0227; F16F 9/0281; F16F 9/432
(Continued)

(56) References Cited

U.S. PATENT DOCUMENTS

| | | | | | |
|---|---|---|---|---|---|
| 4,792,128 A | * | 12/1988 | Holley | .................. | F16F 9/0218 267/118 |
| 5,275,387 A | * | 1/1994 | Cotter | .................. | F16F 9/0227 188/322.17 |

(Continued)

FOREIGN PATENT DOCUMENTS

EP    1241373 B1    10/2007

OTHER PUBLICATIONS

International Search Report and Written Opinion in PCT/US2017/053404 dated Dec. 8, 2017 (7 pages).

*Primary Examiner* — Christopher P Schwartz
(74) *Attorney, Agent, or Firm* — Reising Ethington, PC

(57) ABSTRACT

A gas spring for forming equipment may have a casing with an axially extending side wall, an open end, and a closed end wall with the walls defining in part a pressure chamber to receive a gas under pressure, a bearing assembly received in the casing, a piston rod slidably received in the bearing assembly for reciprocation between extended and retracted positions, a piston retainer received in the casing and separate from and normally carried by the piston rod, a deforming member in the casing adjacent its closed end wall, and configured to plastically deform the retainer when the piston rod is forced into the pressure chamber into an overtravel retracted position beyond its designed intended maximum retracted position and after such overtravel the piston rod returns to at least its extended position and the deformed retainer engages the bearing assembly and is fractured and separated from the piston rod. The gas spring may have a piston rod seal and a passage in the piston rod communicating with the pressure chamber and opening onto the piston rod at a location that do both axially inboard of engagement of the seal with the piston rod when it is in its normal extended position and generally axially outboard of and bypassing or disrupting the seal after overtravel of the (Continued)

piston rod and the retainer has separated from it and it has moved to a further extended position relative to its designed intended normal maximum extended position to thereby provide a path for compressed gas in the pressure chamber to pass through the passage to the exterior of the open end of the casing.

17 Claims, 4 Drawing Sheets

(52) U.S. Cl.
CPC . *F16F 2222/126* (2013.01); *F16F 2230/0023* (2013.01); *F16F 2230/24* (2013.01)

(58) Field of Classification Search
USPC .............. 188/300, 322.16–322.17, 371–376; 267/129
See application file for complete search history.

(56) References Cited

U.S. PATENT DOCUMENTS

| | | | | |
|---|---|---|---|---|
| 5,303,906 | A * | 4/1994 | Cotter | F16F 9/0227 188/300 |
| 5,975,507 | A * | 11/1999 | Cotter | F16F 9/43 267/64.11 |
| 6,086,059 | A * | 7/2000 | Runesson | F16F 7/123 188/300 |
| 9,291,265 | B2 * | 3/2016 | Cappeller | F16J 10/00 |
| 9,347,510 | B2 * | 5/2016 | Cotter | F16F 9/02 |
| 9,416,840 | B2 | 8/2016 | Vandine | |
| 2016/0032999 | A1 * | 2/2016 | Cappeller | F16F 9/0218 267/129 |

* cited by examiner

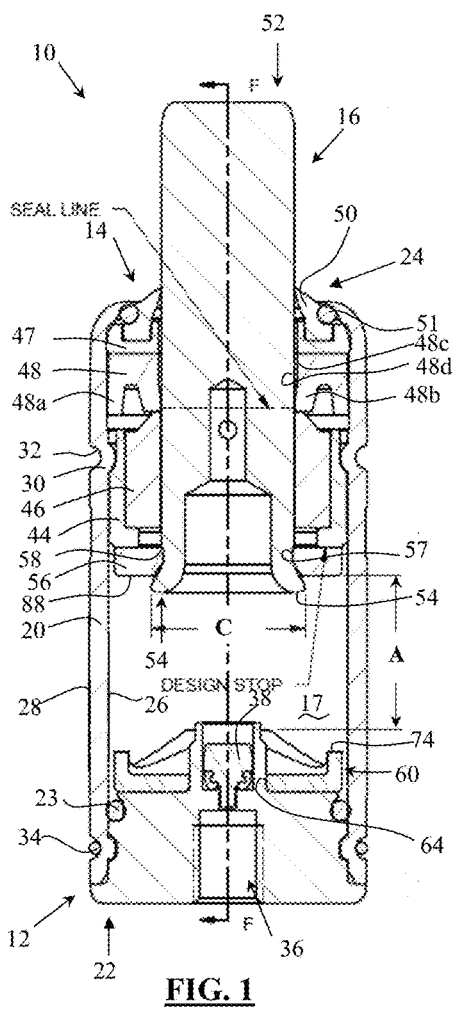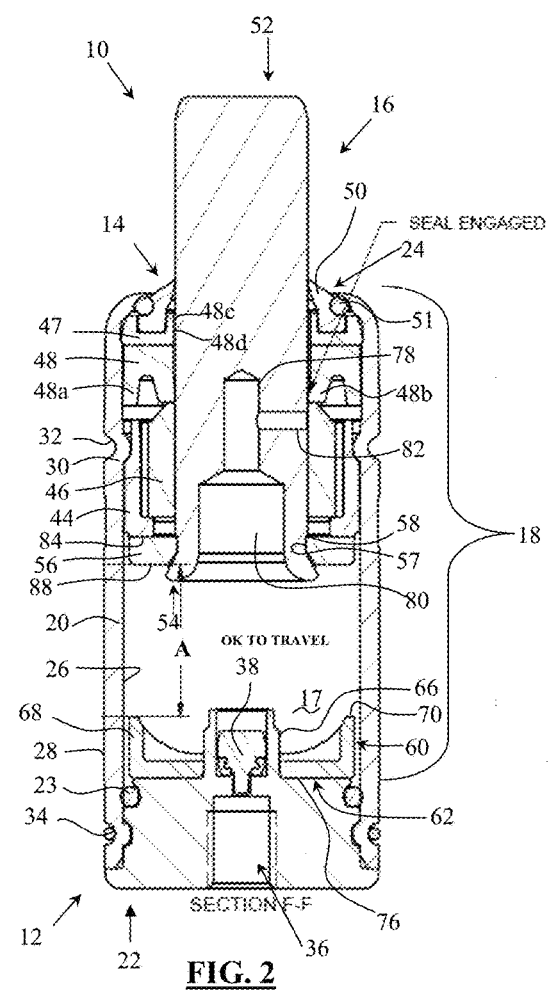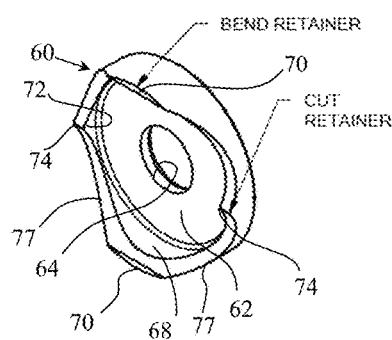

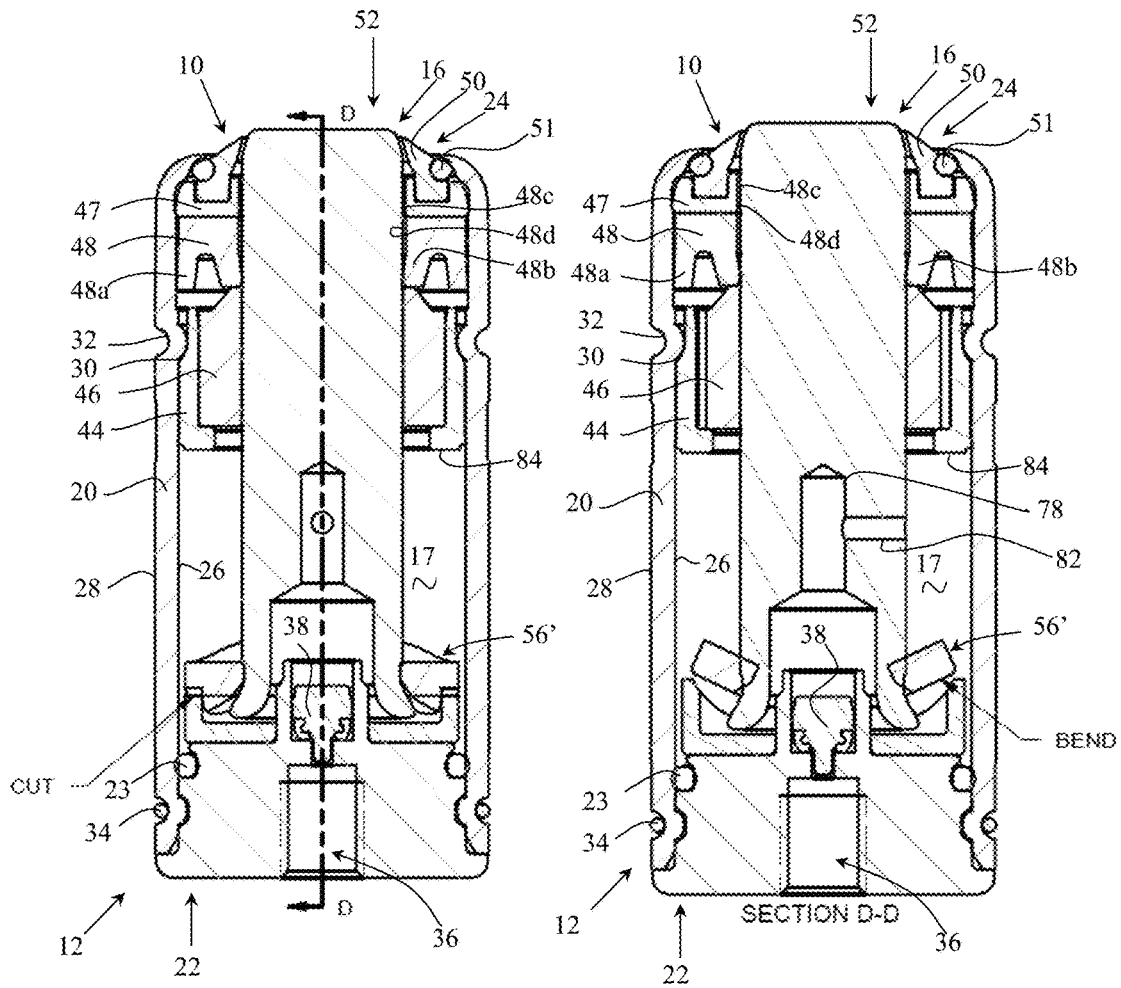
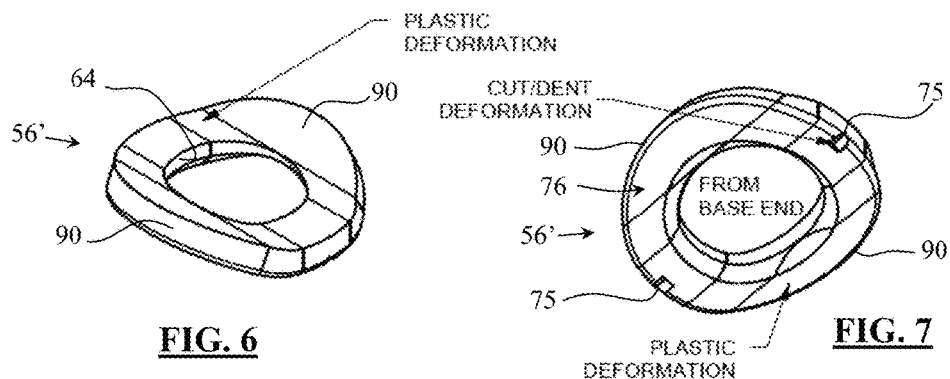

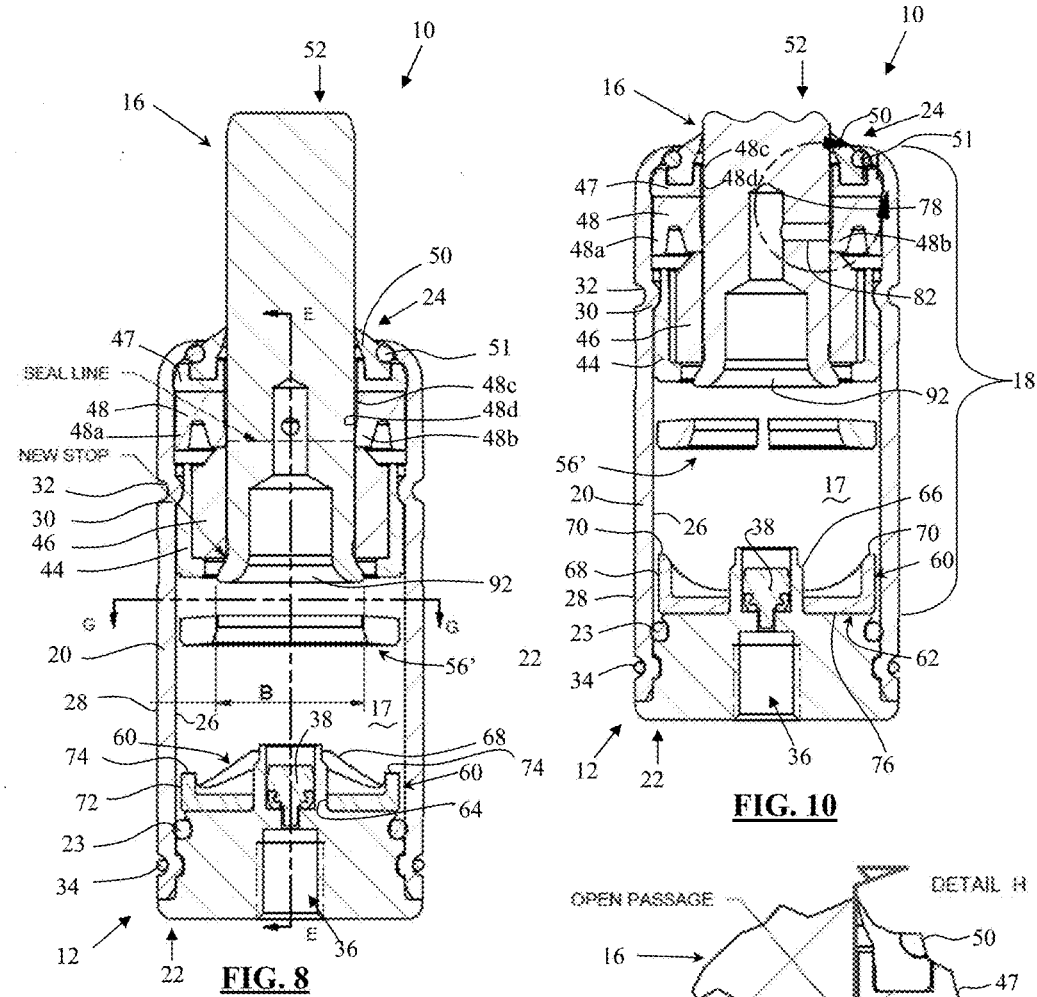

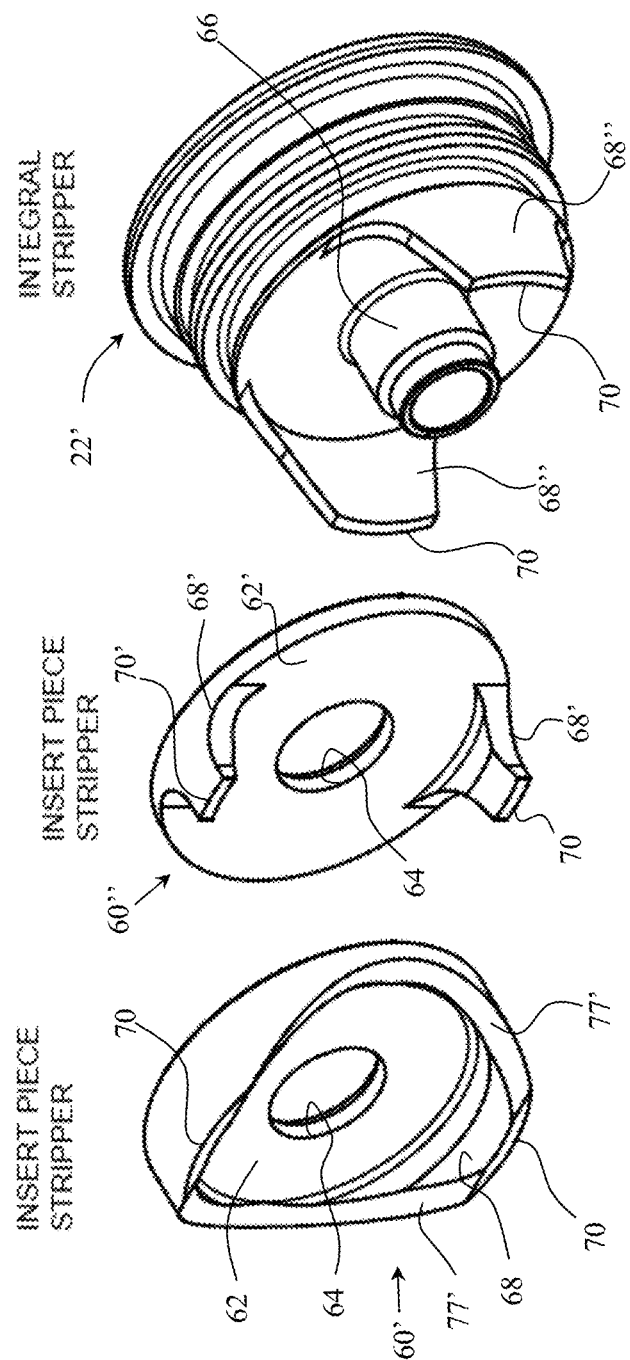

OVERTRAVEL RELIEF ASSEMBLY FOR A GAS SPRING

This is a provisional patent application under 35 USC § 111(b).

TECHNICAL FIELD

This invention relates generally to gas springs and, more particularly, to overtravel relief features for gas springs.

BACKGROUND

Gas springs are well known and have been used in dies of presses for sheet metal stamping operations. For example, gas springs can be used as press cushions, among many other types of applications. A conventional gas spring may include a casing, a piston rod carried in the casing, a bearing and seal housing held in the casing by a retainer to guide and retain the piston rod within the casing, and a pressure chamber to hold pressurized gas, typically nitrogen at an operating pressure of, for example, 1,500 to 3,000 PSI in some applications. The housing includes one or more bearings to guide movement of the piston rod within the casing, and one or more seals to prevent leakage from the pressure chamber. The pressurized gas biases the piston rod to an extended position, and yieldably resists movement of the piston rod from the extended position to a retracted position. But in use, the piston rod may overtravel beyond a design intended retracted position, and such overtravel may result in undesirable overpressure, damage to the gas spring and/or and other adverse conditions. The rapid return from an overtravel position of a piston rod may also damage the forming equipment and/or workpiece with which the gas spring is used. In an overtravel position of the piston rod the gas pressure in the chamber may be 50% to 75% higher than its pressure in the normally fully extended position of the piston rod.

SUMMARY

In at least some implementations, a gas spring for forming equipment may have a casing with an axially extending side wall, an open end, a closed end wall and the walls defining in part a pressure chamber to receive a gas under pressure, a bearing assembly received in the casing, a piston rod slidably received in the bearing assembly for reciprocation between extended and retracted positions, a piston retainer received in the casing, separate from and normally carried by the piston rod, and a deformation member in a casing adjacent to the closed end wall and constructed and arranged to plastically deform the retainer when the piston rod is forced into the casing into an overtravel position beyond its designed intended maximum retracted position and after such overtravel and the piston rod returns to at least its extended position, the deformed retainer engages the bearing assembly and is fractured and separated from the piston rod. In at least some implementations, the deforming member may have two circumferentially spaced apart legs projecting generally axially toward the retainer and underlying and at least slightly spaced from the retainer when the piston rod is forced into the pressure chamber to the maximum extent of its design intended normal operating retracted position.

In some implementations, the retainer may be a circumferentially continuous ring normally connected to the piston rod by a flared portion of the piston rod underlying an adjacent portion of the retainer. In some implementations, the legs of the deforming member may have relatively pointed ends configured to form a pair of generally diametrically opposed indentations in the retainer when it is deformed by being forced into the pointed ends by overtravel of the piston rod beyond its designed intended maximum retracted position. In some implementations, the deforming member may be a collar with an annular base portion carried by the closed end wall of the casing and with at least two legs circumferentially spaced apart and carried on the annular base adjacent its outer periphery.

In at least some implementations, the gas spring for forming equipment may include a piston rod seal received in the casing generally axially between its open end and the bearing assembly and at least one passage in the piston rod communicating with the pressure chamber and an opening onto a generally cylindrical surface of the piston rod at a location which is both generally axially inboard of the engagement of the seal with the piston rod when it is its normally extended position and generally outboard of and bypassing or disrupting sealing engagement of the seal with the piston rod after overtravel of the piston rod has separated the retainer from it and it has moved to a further extended position relative to the design intended normal maximum extended position to provide a path for compressed gas in the pressure chamber to pass through the passage and to the exterior of the open end of the casing.

BRIEF DESCRIPTION OF THE DRAWINGS

The following detailed description of preferred embodiments and best mode will be set forth with regard to the accompanying drawings in which:

FIG. 1 is a sectional view of a presently preferred form of a gas spring with a piston rod in an extended position and having an overtravel relief assembly;

FIG. 2 is a sectional view taken on line F-F of the gas spring of FIG. 1, further illustrating the relief assembly;

FIG. 3 is a pictorial view of a retainer deforming component of the gas spring;

FIG. 4 is a sectional view of the gas spring of FIG. 1, illustrating the piston in an overtravel position and the deforming of the piston rod retainer by overtravel engagement with the deforming component;

FIG. 5 is a sectional view taken on line D-D of FIG. 4 and further illustrating the piston rod overtravel deforming the piston rod retainer;

FIG. 6 is a pictorial view of the deformed retainer from one side of it;

FIG. 7 is a pictorial view of the deformed retainer from the other side of it;

FIG. 8 is a sectional view of the gas spring of FIG. 1 illustrating a returned extended position of the piston rod and separation of the retainer after overtravel of the piston rod deforming the retainer;

FIG. 9 is a sectional view on line G-G of FIG. 8 illustrating fracture of the piston rod retainer after overtravel and return of the piston rod;

FIG. 10 is a sectional view taken on line E-E of FIG. 8 and illustrating the relationship of a gas flow passage relative to a piston rod seal of the gas spring after overtravel of the piston rod and its return to a further extended position;

FIG. 11 is an enlarged fragmentary sectional view of the circled portion H of FIG. 10 illustrating an overtravel gas pressure relief path to the exterior of the gas spring;

FIG. 12 is a pictorial view of a modified deforming component;

FIG. 13 is a pictorial view of another modified deforming component; and

FIG. 14 is a pictorial view of another modified deforming component as an integral part of an end wall of the gas spring.

DETAILED DESCRIPTION OF PREFERRED EMBODIMENTS

Referring in more detail to the drawings, FIG. 1 illustrates a gas spring 10 that may be used in forming equipment, for example, sheet metal stamping dies and mechanical presses (not shown). In general, the gas spring 10 may include a casing 12, a guide and seal assembly 14 carried by the casing 12, a piston rod 16 carried by the casing 12 and extending through the guide and seal assembly 14, and a pressure chamber 17. In use, an outer axial end of the piston rod 16 may be engageable with or by a die member or another portion of a press or piece of forming equipment (not shown).

For example, one or more of the gas springs 10 may be used in various implementations in forming equipment to provide a moveable component for support of a forming die or a workpiece with a yielding force or a return force. For example, in a binder ring implementation, the gas spring 10 may provide a yielding force against a binder ring of a forming die to hold a metal workpiece while another part of the forming die forms, cuts, stretches, stamps, pierces, or bends the workpiece or withdraws from the workpiece. In a lifter implementation, the gas spring 10 may provide a yielding force and return force to lift a workpiece off of a surface of the forming die or to otherwise maintain control of the workpiece. In a cam tool implementation, the gas spring 10 may apply a yielding force to return a cam-activated tool to its home position. Of course, the gas spring 10 may be used in a wide range of other implementations.

According to the present disclosure, the gas spring 10 includes an overstroke or overtravel relief assembly 18 in the event of an overtravel condition of the piston rod 16 of the gas spring 10. As will be discussed in greater detail below, the overtravel relief assembly 18 may function to allow pressurized gas to be communicated out of the pressure chamber 17, to provide protection due to an overtravel condition, including possible overpressure of gas in the pressure chamber 17, and/or to disable further normal use of the gas spring. As used herein, the terminology "overtravel condition" includes a condition where a die member, or any other machine component with which the gas spring 10 interacts, causes the piston rod to be retracted into the casing 12 beyond a design intended position in the gas spring 10.

With reference to FIG. 1, the casing 12 may include a side wall 20 that may terminate axially at a closed end 22 and at an open end 24 that may receive the guide and seal assembly 14 and the piston rod 16 therein. The pressure chamber 17 is established at least in part by the side and end walls 20, 22 to receive a gas under pressure. In the illustrated embodiment, the closed end 22 may be a separate component sealed to the side wall 20 by a seal 23 and coupled thereto, for example, by crimping, swaging, or other forming. In other embodiments, the closed end 22 may be coupled to the side wall 20 via a weld joint, or may be integrally produced with the side wall 20. The side wall 20 of the casing 12 has an inner surface 26 defining at least in part the pressure chamber 17, and an outer surface 28. The casing 12 may be of generally cylindrical shape, for example, wherein at least one of the inner or outer surfaces 26, 28 is cylindrical. The side wall 20 may have a circumferentially extending retainer bead 30 to axially retain at least a portion of the guide and seal assembly 14 to maintain the gas spring 10 in its assembled state. To facilitate mounting and locating the gas spring 10 within a press, a pair of longitudinally spaced circumferential grooves 32, 34 may be machined, swaged, formed, or otherwise provided in the outer surface 28 of the casing 12. To admit gas into the gas spring 10, the casing 12 may include a passage or fill port 36 that may be provided through the closed end 22 of the casing 12 in any suitable manner. A fill valve 38 may be carried by the casing 12 to allow the gas spring 10 to be pressurized through the fill port 36 and to close the fill port 36 when the gas spring 10 is pressurized. The fill valve 38 may be a poppet valve, as illustrated, but instead may be a Schrader fill valve, or any other suitable type of valve in any suitable location at the closed end 22 of the casing 12.

The guide and seal assembly 14 may be disposed in, or carried proximate to, the open end 24 of the casing 12 and may be sealingly coupled to the casing 12. The assembly 14 may include a piston rod housing 44 and a guide bearing 46 carried by the housing 44. The assembly 14 also may include a piston rod seal 48 that may be disposed between the housing 44 and the open end 24, a seal backup ring 47 that may be disposed between the rod seal 48 and the open end 24, a rod wiper 50 that may be carried between the seal backup ring 47 and the open end 24 and may protrude out of the open end 24, and a casing seal 51 that may include an 0-ring that may be carried between a portion of the wiper 50 and the open end 24. The guide bearing 46 may include one or more components and may be sized to slidably engage the piston rod 16 to guide the piston rod 16 for axial reciprocation within the casing 12. In the illustrated embodiment, the guide bearing 46 includes a bushing, which may be composed of any suitable low friction material. The piston rod seal 48 may include a U-cup seal having a radially outer and circumferentially continuous lip 48a in contact with the interior surface 26 of the casing 12, a radially inner and circumferentially continuous lip 48b in contact with an exterior surface of the piston rod 16, and a radially inner and circumferentially continuous downstream inner backing lip 48c with a circumferentially continuous scallop or shallow relief area 48d between the lips 48b and 48c.

The piston rod 16 is disposed at least in part in the casing 12 and through the guide and seal assembly 14 for reciprocation along an axis A between extended and retracted positions over a cycle of the gas spring 10 including a retraction stroke and an extension or return stroke. The piston rod 16 is acted on by pressurized gas in the pressure chamber 17 to bias the piston rod 16 toward the extended position, and away from the retracted position. The piston rod 16 extends out of the casing 12 through the guide and seal assembly housing 44, and includes an outer axial end 52, and an inner axial end 54 disposed in the casing 12 and that may be radially enlarged. For example, a piston retainer 56 may be coupled to the inner axial end 54, for instance, via swaging of the piston rod 16 thereto. The retainer may have a central through hole 57 and may engage a shoulder 58 of the piston rod 16. The retainer 56 may be engageable with a portion of the piston rod housing 44 to retain the piston rod 16 in the casing 12. The piston rod 16 is in sealing engagement with the rod seal 48 and in sliding engagement with the piston rod bearing 46 for guided relative movement between the extended and retracted positions.

The overtravel relief assembly 18 may include a deforming component 60 which as shown FIGS. 4 & 5 in an overtravel of the piston rod 16 may be engaged by the retainer 56 to deform the retainer so that as shown in FIGS.

8 & 10 when the piston rod returns from the overtravel condition the deformed retainer 56' is separated from the piston rod and passages in the piston rod may permit pressurized gas in the chamber 17 to escape to the exterior of the gas spring. As shown in FIGS. 1-3, the deforming component 60 may be in the form of a collar received in the pressure chamber 17 and may be carried by the closed end or plug 22 of the casing. The collar 60 may have a generally flat and circular base 62 with a central and desirably coaxial hole 64 which may be received with an interference fit over an annular sleeve 66 of the end plug 22 in which the filler valve 38 is received. The collar may have a pair of upstanding legs 68 which may extend generally axially and circumferentially from the base, may be generally diametrically opposed, and may have free ends or edges 70 which may be engaged by the retainer 56 to deform it when the piston rod 16 overtravels into the gas spring casing 12. Desirably, but not necessarily, the collar may also have a pair of diametrically opposed legs 72 with relatively sharp or pointed ends 74 to form indentations or nicks 75 in the bottom face 76 of the retainer to further facilitate fracture of it when the piston rod returns to its extended position. Leg reinforcing portions 77 may extend between adjacent legs.

As shown in FIGS. 4 & 5 the bottom end of the piston rod may have a bore 78 and a counterbore 80, both of which continuously communicate with the pressure chamber 17 and desirably are coaxial with the axis of the piston rod, and a transverse bleed passage 82 communicating bore 78 with the exterior surface of the piston rod 16. As will be apparent by a comparison of FIGS. 2 & 10, the transverse bleed passage 82 is located in the piston rod so that in use of the gas spring, if the piston rod has not overtraveled this passage 82 is axially below or inboard of the inner sealing lip 48*b* of the rod seal 48 when the piston rod is fully extended with the retainer 56 bearing on the bottom end 84 of the housing 44 (FIG. 2), and if the piston rod has overtraveled and upon its return separated from the retainer 56' the piston rod is further extended so that passage 82 may be disposed generally axially outboard of the inner seal lip 48*b* (FIGS. 10 & 11) or otherwise disrupt the seal 48 so that pressurized gas may flow through the passage 82 and between the seal 48 and the piston rod to the exterior of the casing 12 as indicated by the arrow 86 in FIG. 11.

For use the gas spring pressure chamber 17 may be charged with a preferably inert gas such as nitrogen to a pressure which typically may be in the range of 1,000-3,000 psi by any suitable pressurizing device (not shown) which may be coupled to the port 36 to open the valve 38 to introduce pressurized gas through the port and the valve into the pressure chamber. Once a desired pressure of the gas within the chamber 17 is reached, the pressurizing device may be retracted to allow the valve 38 to close and thereby seal the pressurized gas within the pressure chamber 17.

During use of the gas spring, a die member or any other equipment component (not shown) may displace the piston rod 16 in an axially inward direction into the casing 12 to compress the gas in the pressure chamber 17 with the desired design intended maximum displacement of the piston rod into the casing being a distance A (FIG. 1) which desirably provides at least a slight space or clearance between legs 68 of collar and the bottom face 88 of the retainer ring. However, as shown in FIGS. 4 & 5, if the piston rod is further forced into the casing in an overtravel condition the bottom face 88 of the retainer 56 bears on the ends 70 of the legs 68 of the collar 60 and the overtravel of the piston rod causes the retainer to be plastically deformed and it may take the general shape shown in FIGS. 6 & 7 in which portions 90 of the deformed retainer 56' may be bent or forced upwardly relative to its generally planar bottom face 88 with portions of the retainer 56' being plastically deformed and desirably diametrically opposed indentations 75 being formed in the retainer by the legs 72. As shown in FIGS. 8 & 10 when the piston rod returns to a sufficiently extended position the portions 90 of the deformed retainer 56' strike the bottom face 78 of the housing 44 with sufficient force to cause the deformed retainer to fracture or break (desirably at the indentations 75) into two or more pieces and be stripped or separated from the piston rod which may be further advanced from its normal extended position until the flared bottom end portion 92 of the piston rod engages a bottom inner edge of the bearing 46 or bearing housing (and thus the piston rod is in an overextended position). As shown in FIGS. 10 & 11 in this overextended position of the piston rod the transverse passage 82 is disposed generally axially upward or outboard of the inner lip 48*b* of the rod seal so that pressurized gas in the chamber 17 can pass between the remainder of the body portion of the seal 48 (which may be slightly radially outwardly displaced by the pressurized gas) and the piston rod generally through the path 86 between the piston rod and the seal, retainer 47, and wiper 50 to the exterior of the casing 12 to thereby significantly reduce the pressure of the gas in the chamber 17, which renders the gas spring inoperable for its normal intended use. The fracturing and separation of the retainer 56 from the piston rod 16 may also render the gas spring inoperable for its normal use.

Desirably, but not necessarily, and as shown in FIG. 4 the overall length of the piston rod may be designed so that even in its fully retracted overtravel position the die member or other component bearing on its end 52 does not engage and displace or even crush either the wiper 50 or the adjacent end of the casing 12.

Typically on the first return of the piston rod from its overtravel position the deformed retainer 56' is fractured and separated from the piston rod. However, if the deformed retainer 56' is not separated on this first return of the piston rod it will be separated on an immediately succeeding return or a few succeeding returns to the fully extended position of the piston rod even if it is not subjected to a subsequent further overtravel event.

FIG. 12 illustrates a modified deforming member 60' similar to the collar 60 except that it does not have the legs 72 with the sharp ends 74 and thus, in use, does not form any indentations 75 in the deformed retainer 56. The legs 68 are also supported by intermediate upturned collar portions 77'. FIG. 13 illustrates another modified deforming member 60" in the form of a collar with a pair of generally diametrically opposed and axially extending legs 68' which are not interconnected by intermediate support portions 77'. FIG. 14 illustrates a modified end plug 22' in which a pair of generally diametrically opposed legs 68" are fixed to or preferably integral with the plug 22' and perform the same function as the legs 68 and 68' of the deforming member collar forms 60, 60' and 60" respectively.

In assembly, in all forms of the deforming members 60, 60', 60" and 22' the legs underlie and are disposed to be closely adjacent to the outer periphery of the retainer 56 when it engages the ends of the legs to facilitate deforming of the retainer. The retainer 56 may have a maximum outside diameter sufficiently smaller than the inside diameter of the casing sidewall 22 so that when it is deformed by an overtravel event of the piston rod it does not engage the sidewall 26 of the casing which might retard or inhibit the return of the piston rod 16 to an extended position after such overtravel event, and/or fracture and separation of the deformed retainer from the piston rod when the rod returns to its extended position after such overtravel event.

Desirably the flared portion 92 of the bottom end of the piston rod has sufficient structural strength and integrity so that its shape and outside diameter B after separation from the deformed retainer 56' does not significantly decrease compared to its outside diameter C prior to deformation and separation of the retainer ring from the piston rod.

The gas spring 10 may be assembled in any suitable manner and its various components may be manufactured in any suitable manner and composed of any suitable materials. For example, the bushing may be made of bronze or sintered powdered metal such as steel, the seals of suitable polymers and at least most of the other components of steel.

It should be appreciated that one of ordinary skill in the art will recognize other embodiments encompassed within the scope of this invention. The plurality of arrangements shown and described above are merely illustrative and not a complete or exhaustive list or representation. Of course, still other embodiments and implementations can be achieved in view of this disclosure. The embodiments described above are intended to be illustrative and not limiting. The scope of the invention is defined by the claims that follow.

The invention claimed is:

1. A gas spring for forming equipment, comprising:
   a casing with an axially extending side wall, an open end, a transversely extending closed end wall axially spaced from the open end, and a pressure chamber defined in part by the side and end walls to receive a gas under pressure;
   a bearing assembly received in the casing;
   a piston rod slidably received in the bearing assembly for reciprocation between extended and retracted positions;
   a piston rod seal received in the casing generally axially between the bearing assembly and the open end of the casing;
   a piston retainer received in the casing and separate from and normally carried by the piston rod adjacent an end of the piston rod received in the casing and normally having at least a portion thereof extending circumferentially continuously around the piston rod;
   a deforming member in the casing adjacent to the closed end wall of the casing, and having at least two circumferentially spaced apart legs projecting generally axially toward the retainer and underlying and at least slightly spaced from the retainer when the piston rod is forced into the pressure chamber to the maximum extent of its design intended normal operating retracted position of the piston rod; and
   when the piston rod is forced into the casing into an overtravel position beyond its design intended maximum retracted position the retainer engages the legs and is plastically deformed; and
   after such overtravel and the piston rod returns to its extended position the deformed retainer engages the bearing assembly and is fractured and separated from the piston rod.

2. The gas spring of claim 1, which also comprises at least one passage in the piston rod communicating with the pressure chamber and opening onto a portion of a generally cylindrical surface of the piston rod at a location which is both generally axially inboard of the sealing engagement of the seal with the piston rod cylindrical surface when the piston rod is in its normal extended position with the retainer engaging the bearing assembly and generally axially outboard of and bypassing or disrupting this sealing engagement after overtravel of the piston rod the retainer has separated from the piston rod and the piston rod has moved to a further extended position relative to the design intended normal maximum extended position of the piston rod to thereby provide a path for compressed gas in the pressure chamber to pass through the passage and to the exterior of the open end of the casing.

3. The gas spring of claim 2, wherein the piston rod seal is a U-cup seal having a radially outer lip in contact with an interior surface of the casing, a radially inner lip normally in contact with an exterior surface of the piston rod, a radially inner backing lip axially spaced outward of the radially inner lip and in contact with an exterior surface of the piston rod, and a circumferentially continuous recess between the radially inner lip and the backing lip.

4. The gas spring of claim 3, wherein after overtravel of the piston rod, separation of the retainer from the piston rod and the piston rod has returned to such overextended position, compressed gas in the pressure chamber passes through such at least one passage, across the recessed portion and between the backing lip and the piston rod and through the open end of the casing to the exterior of the gas spring.

5. The gas spring of claim 1, which also comprises a backing ring disposed between the seal and the open end of the casing and bearing on the seal.

6. The gas spring of claim 3, which also comprises a piston rod wiper engaging and encircling the piston rod and, at least in part, received between the backing ring and the open end of the casing.

7. The gas spring of claim 1, wherein the deforming member also comprises a pair of generally diametrically opposed legs projecting generally axially and having relatively pointed ends underlying the retainer and configured to form a pair of generally diametrically opposed indentations in the retainer when it is deformed by being forced into the other legs of the deforming member by overtravel of the piston rod beyond such design intended maximum retracted position of the piston rod.

8. The gas spring of claim 1, wherein the retainer comprises a circumferentially continuous ring connected to the piston rod by a flared portion of the rod underlying an adjacent portion of the retainer.

9. The gas spring of claim 1, wherein the piston rod adjacent its end in the pressure chamber includes a shoulder, the retainer is a ring with a central hole through which such end portion is received with the retainer ring bearing on the shoulder and an end portion of a piston rod is flared over part of the retainer ring.

10. The gas spring of claim 1, wherein the piston seal comprises a generally U-cup seal having a radially outer lip in contact with an interior surface of the side wall of the casing and a radially inner lip in contact with an exterior surface of the piston rod.

11. The gas spring of claim 1, wherein the legs of the deforming member are integral with the closed end wall of the casing.

12. The gas spring of claim 1, wherein the deforming member comprises a collar having an annular base portion carried by the closed end wall of the casing and the at least two legs are circumferentially spaced apart on and carried by the annular base adjacent the out periphery of the annular base.

13. The gas spring of claim 1, wherein the deforming member also comprises an annular base and a pair of legs with pointed ends generally diametrically opposed and carried by the annular base.

14. The gas spring of claim 1, wherein the piston rod seal is a U-cup seal having a radially outer lip in contact with an interior surface of the casing, a radially inner lip normally in contact with an exterior surface of the piston rod, a radially inner backing lip axially spaced outward of the radially inner lip and in contact with an exterior surface of the piston rod, and a circumferentially continuous recess between the radially inner lip and the backing lip.

15. The gas spring of claim 1, wherein each of the piston rod, retainer, deforming member, and side wall of the casing comprise a steel material.

16. A gas spring for forming equipment, comprising:
a casing with an axially extending side wall, an open end, a transversely extending closed end wall axially spaced from the open end, and a pressure chamber defined in part by the side and end walls to receive a gas under pressure;
a bearing assembly received in the casing;
a piston rod slidably received in the bearing assembly for reciprocation between extended and retracted positions and having a shoulder adjacent an end of the piston rod received in the casing;
a piston rod seal received in the casing generally axially between the bearing assembly and the open end of the casing;
a separate piston retainer ring of metal received in the casing and normally carried by the piston rod adjacent the end of the piston rod received in the casing and normally having at least a portion thereof extending circumferentially around the piston rod and bearing on the shoulder;
a deforming member in the casing adjacent to the closed end wall of the casing, and having at least two circumferentially spaced apart legs projecting generally axially toward the retainer ring and underlying and at least slightly spaced from the retainer ring when the piston rod is forced into the pressure chamber to the maximum extent of its design intended normal operating retracted position of the piston rod; and when the piston rod is forced into the casing into an overtravel position beyond its design intended normal maximum retracted position the retainer ring engages the legs and is plastically deformed; and after such overtravel and the piston rod returns to its extended position the deformed retainer ring engages the bearing assembly and is fractured and separated from the piston rod.

17. The gas spring of claim 16, which also comprises at least one passage in the piston rod communicating with the pressure chamber and opening onto a portion of a generally cylindrical surface of the piston rod at a location which is both generally axially inboard of the sealing engagement of the seal with the piston rod cylindrical surface when the piston rod is in its normal extended position with the retainer ring engaging the bearing assembly and generally axially outboard of and bypassing or disrupting this sealing engagement after overtravel of the piston rod the retainer has separated from the piston rod and the piston rod has moved to a further extended position relative to the design intended normal maximum extended position of the piston rod to thereby provide a path for compressed gas in the pressure chamber to pass through the passage and to the exterior of the open end of the casing.

* * * * *